US011633898B2

(12) United States Patent
Geltinger et al.

(10) Patent No.: US 11,633,898 B2
(45) Date of Patent: Apr. 25, 2023

(54) APPARATUS AND METHOD FOR HEATING PLASTIC PREFORMS WITH BLOW-OUT DEVICE (71) Applicant: KRONES AG, Neutraubling (DE)

(72) Inventors: Florian Geltinger, Donaustauf (DE); Norbert Kindl, Tegernheim (DE)

(73) Assignee: KRONES AG ( * ) Notice: Subject to any disclaimer, the term of this patent is extended or adjusted under 35 U.S.C. 154(b) by 0 days.

(21) Appl. No.: 17/459,742

(22) Filed: Aug. 27, 2021

(65) Prior Publication Data
US 2022/0063172 A1 Mar. 3, 2022

(30) Foreign Application Priority Data
Aug. 27, 2020 (DE) ...................... 10 2020 122 472.9

(51) Int. Cl.
B29C 49/42 (2006.01)
B29C 49/36 (2006.01)
B29C 49/64 (2006.01)

(52) U.S. Cl.
CPC .......... B29C 49/4205 (2013.01); B29C 49/36 (2013.01); B29C 49/6418 (2013.01)

(58) Field of Classification Search
CPC .......... B29C 49/4205; B29C 49/42095; B29C 49/36; B29C 49/6418
See application file for complete search history.

(56) References Cited

U.S. PATENT DOCUMENTS

| 8,453,419 | B2 | 6/2013 | Roithmeier et al. ............. 53/426 |
| 9,090,408 | B2 | 7/2015 | Hahn et al. ............. B65G 29/00 |
| 9,457,114 | B2 | 10/2016 | Loy ............................ A61L 2/26 |
| 2006/0011263 | A1 | 1/2006 | Till ................................ 141/147 |
| 2016/0193775 | A1* | 7/2016 | Lewin ...................... B29C 49/46 |
| | | | 264/454 |

(Continued)

FOREIGN PATENT DOCUMENTS

| CN | 110341166 A | * 10/2019 | ......... B29C 49/4205 |
| DE | 10140906 | 3/2003 | ............... B08B 6/00 |

(Continued)

OTHER PUBLICATIONS

Extended Search Report issued in European Patent Appln. No. 21185536, dated May 16, 2022, with English translation, 11 pages.

(Continued)

Primary Examiner — Robert B Davis
(74) Attorney, Agent, or Firm — Hayes Soloway P.C.

(57) ABSTRACT

Apparatus for heating plastic preforms with a transport device which transports the plastic preforms during their heating along a predetermined transport path, with a first feed transport device which directly transfers the plastic preforms to the transport device in a transfer region, wherein this first feed transport device having a carrier which can be rotated with respect to an axis of rotation and has a plurality of holding devices which hold the plastic preforms, wherein each of these holding devices is in each case assigned an application device, wherein these application devices being arranged on a carrier which can be rotated about an axis of rotation.

17 Claims, 4 Drawing Sheets (56) References Cited

U.S. PATENT DOCUMENTS

| | | | | |
|---|---|---|---|---|
| 2016/0200028 A1* | 7/2016 | Lewin | ................. | B29C 49/6409 |
| | | | | 264/446 |
| 2016/0229108 A1* | 8/2016 | Aoki | ..................... | B67C 7/0073 |
| 2017/0252960 A1 | 9/2017 | Baumgarte et al. | .... | B29C 49/80 |
| 2020/0215739 A1 | 7/2020 | Mueller et al. | ......... | F29C 49/42 |

FOREIGN PATENT DOCUMENTS

| | | | | |
|---|---|---|---|---|
| DE | 10 2009 041 215 | 3/2011 | ............. | B29C 49/42 |
| DE | 10 2009 058 084 | 6/2011 | ............... | B65C 9/02 |
| DE | 10 2014 012 528 | 3/2016 | ............. | B65G 47/84 |
| DE | 10 2017 114 766 | 1/2019 | ............. | B29C 49/42 |
| EP | 2 096 055 | 9/2009 | ............. | B65G 47/84 |
| EP | 2746029 | 6/2014 | ............. | B29C 49/42 |
| EP | 3 549 744 | 10/2019 | ............. | B29C 49/42 |
| WO | WO-2007085409 A1 * | 8/2007 | ......... | B29C 49/4205 |

OTHER PUBLICATIONS

Search Report issued in European Patent Appln. No. 21185536, dated Jan. 14, 2022, with English translation, 15 pages.
German Search report issued in related application Serial No. 10 2020 122 472.9, dated May 10, 2021 with English translation (16 pages).

* cited by examiner

APPARATUS AND METHOD FOR HEATING PLASTIC PREFORMS WITH BLOW-OUT DEVICE

BACKGROUND OF THE INVENTION

The present invention is therefore based on the object of providing an apparatus and a method with which the installation space for corresponding systems can be reduced.

SUMMARY OF THE INVENTION

For example, these plastic preforms are first passed through an oven and heated to a temperature that enables a stretch blow moulding process. It is also known from the prior art to treat the plastic preforms before or after their heating, for example to blow them out with sterile or ionised air. For this purpose, in the prior art, corresponding blow-out stars are usually provided either before or after the oven, which blow out the plastic preforms or them with air. However, this procedure requires more space. In addition, further transport starwheels and processing units are sometimes provided, which also requires further transfer mechanisms for the plastic preforms.

The present invention is therefore based on the object of providing an apparatus and a method with which the installation space for corresponding systems can be reduced. According to the invention, this is achieved by the subject matters of the independent patent claims. Advantageous embodiments and examples are the subject matter of the subclaims.

An apparatus according to the invention for heating plastic preforms has a transport device which transports the plastic preforms along a predetermined transport path during their heating, wherein this transport device having a plurality of holding devices for holding the plastic preforms during their transport. Furthermore, the apparatus has a feed transport device which directly transfers the plastic preforms to the transport device in a transfer area, wherein this feed transport device having a carrier which can be rotated with respect to an axis of rotation and on which a plurality of holding devices which hold the plastic preforms are arranged.

According to the invention, each of these holding devices is associated with a respective application device which acts upon the plastic preforms through their openings with a flowable, in particular gaseous medium, wherein these application devices are arranged on a carrier which is rotatable about the axis of rotation.

It is thus proposed in the context of the invention that the transport device which is referred here as the feed transport device and which is usually present in such installations is also used to apply a flowable medium to the plastic preforms. In this way, further transfers and transport starwheels can be avoided.

Holding devices of the feed transport devices are understood to be those holding devices which, either alone or in interaction with other elements, such as a guide arch, are suitable and intended to hold and/or support the plastic preforms. Preferably, the holding devices contact at least one area of the plastic preforms to be held, for example an area below a support ring of the plastic preforms.

The described transport device of the heating device preferably transports the plastic preforms individually, wherein the holding devices described here are provided. The feed transport device is preferably the transport device that simultaneously also separates the plastic preforms.

Preferably, therefore, the feed transport device is a separating device and/or a so-called clock-in starwheel, which is also used to separate plastic preforms fed in series or to assign them to individual holding devices.

Advantageously, the apparatus described here has a device downstream of the heating device for forming plastic preforms into plastic containers, in particular a stretch blow-moulding machine.

In a preferred embodiment, the heating device is an infrared oven comprising a plurality of stationary heating devices arranged along the transport path of the plastic preforms. However, another type of oven is also conceivable as a heating device, such as a microwave oven, within which the plastic preforms are heated.

Advantageously, the holding devices of the oven are holding mandrels engaging in the mouths of the plastic preforms. In particular, these mandrels are rotatable with respect to a longitudinal direction of the plastic preforms, wherein a more uniform heating of the plastic preforms is achieved by this rotation of the plastic preforms.

The flowable medium described above can be a liquid, gaseous, aerosol or vapour medium. In particular, the flowable medium is air and particularly preferably ionised air and/or sterile air.

Preferably, the apparatus comprises at least one ionisation device for ionising the air supplied to the plastic preforms.

Direct transfer is understood to mean that the transport device of the oven is directly connected to the feed transport device and the plastic preforms are transferred, in particular, directly from the feed transport device to the transport device.

Preferably, the carrier on which the holding devices for the plastic preforms are arranged and the carrier on which the application devices are arranged are arranged parallel to each other. However, it would also be conceivable that only a circular carrier is present, which on the one hand has the holding devices for the plastic preforms and on which on the other hand the application devices are also arranged.

In a preferred embodiment, the application devices have nozzles or are nozzles. Preferably, the axes of rotation of the two carriers are the same. In addition, it is also conceivable that both the holding devices and the application devices are arranged on one carrier.

In a preferred embodiment, the application devices are arranged above the plastic preforms. In particular, the application devices are arranged above the mouths of the plastic preforms.

In this case, the feed transport device is preferably suitable and intended to act upon the plastic preforms via their mouths.

In a further preferred embodiment, the apparatus comprises a reservoir for storing the flowable or gaseous medium and/or a generating device for generating the flowable or gaseous medium. Preferably, this reservoir is arranged in a stationary position. For example, an annular air duct may be provided.

In a preferred embodiment, the apparatus has a distribution device for distributing the gaseous medium from this reservoir to these individual application devices. For this purpose, a so-called rotary distributor can be used, for example.

In a preferred embodiment, the apparatus also comprises a pressure generating device such as a compressor to provide the gaseous medium at an overpressure.

In a further preferred embodiment, the application devices are movable relative to the plastic preforms associated with these application devices in a direction which has a component in the radial direction of the rotatable carrier. At this point, it should be noted that the application devices and the holding devices of the transport device both engage in principle with the plastic preform, or are inserted into it. For this reason, it should be avoided that the application devices collide with the holding devices.

It would also be conceivable for the application devices to be movable relative to the plastic preforms assigned to them in a longitudinal direction of the plastic preforms to such an extent that they are guided out of a collision area with the holding devices of the transport devices.

In a preferred embodiment, one application device is assigned to each plastic preform. In particular, a collision of the holding devices with the application devices is to be avoided, in particular in the above-mentioned transfer area of the plastic preforms. It is conceivable that the application devices are moved in said radial direction, but it is also conceivable that the plastic preforms are moved in the radial direction.

In addition, a combined movement of both the application devices and the plastic preforms would also be conceivable. In addition, it is also conceivable that the holding devices of the transport device are also movable in a transfer area, e.g. are moved back, in order to avoid a collision with the application devices. Preferably, the movement of the application devices is a radial movement in a radial direction of the rotatable carrier of the feed transport device.

In a further preferred embodiment, the application devices are movable relative to the plastic preforms assigned to these application devices with respect to the carrier. In this particular embodiment, the application devices are thus moved and preferably moved inwards, in particular with respect to the rotatable carrier. For this purpose, radially extending grooves can be arranged on the carrier, within which the application devices can be moved. It would be possible for the application devices to be retracted at a certain position.

Preferably, individual application devices or groups of application devices, in particular those that are arranged one behind the other, can be moved together.

In a further preferred embodiment, the application devices can be moved relative to the plastic preforms assigned to these application devices in the transfer area in the direction of the axis of rotation. This means that the application devices are retracted, in particular radially inwards, especially in the transfer area. In this way, a collision with the holding devices or the holding mandrels of the subsequent transport device can be carried out.

In a further preferred embodiment, the apparatus has a drive device which causes the movements of the application devices relative to the carrier. In particular, a guide cam can be provided which causes the individual application devices to retract, in particular in the transfer area.

In particular, this can be a so-called guide curve, which retracts the application devices in this area and, if necessary, also returns them to their starting position. However, it is also possible that drive devices are provided which cause these movements, such as pneumatic drives, hydraulic drives or electric motor drives.

In a further preferred embodiment, the application devices are movable in a longitudinal direction of the plastic preforms relative to the plastic preforms. In this way, the application devices can be inserted into the mouths of the plastic preforms in order to act upon them more easily, for example to blow them out.

In this way, it is easier to act upon the plastic preforms with, for example, ionised air, sterile air or similar. It is also conceivable that the apparatus has a lifting cam which introduces the application devices into the plastic preforms. Preferably, however, individual drives are provided here which introduce the individual application devices into the plastic preforms. In this way, different lengths of plastic preforms can be taken into account more easily and a changeover is easier.

Preferably, therefore, at least one drive device and preferably a plurality of drive devices are provided to move the application devices relative to the plastic preforms in their longitudinal directions. These individual drives can be in particular, but not exclusively, pneumatic, electric or hydraulic drives.

In a further preferred embodiment, the holding devices of the feed transport device are recesses arranged on an outer circumference of the carrier. Circumferential areas of the plastic preforms, for example, rest in these recesses and, in particular, support rings of the plastic preforms are supported in these recesses.

Furthermore, a curve and/or a guide arch is provided, which supports the plastic preforms from the opposite side. In this way, the plastic preforms are preferably guided separately by the feed transport device.

Preferably, the feed transport device is a so-called clock.in starwheel. This brings the individual plastic preforms, which are fed, for example, from a feed rail, into a separation. Preferably, a further transport device is therefore provided upstream of the feed transport device, which, however, does not separate the plastic preforms, but conveys them piece by piece.

This can be a feed rail, for example.

In a further preferred embodiment, the device has a feed block which can block the feed of the plastic preforms into the feed transport device if required.

In a further preferred embodiment, therefore, the feed transport device or the transport device is preceded by a further transport device for transporting the plastic preforms, which transfers the plastic preforms to the feed transport device and which transports the plastic preforms in a row.

This means that the plastic preforms are preferably guided directly next to each other. A sorting device can be provided upstream of this further transport device, which sorts or aligns the plastic preforms. This can be a roller sorter, for example. In a further preferred embodiment, the feed transport device takes the plastic preforms directly from the further transport device.

In a further preferred embodiment, the feed transport device has a guide arch which is arranged in particular radially outside the rotatable carrier, wherein the plastic preforms being guided between the holding devices of a rotatable carrier and this guide arch. Advantageously, this guide arch is arranged stationary. This guide arch preferably has a circular segment-shaped profile.

Preferably, this guide arch is fixed to a carrier. In particular, this guide arch or this guide set is preferably fastened to a carrier by means of actuating or fastening devices, wherein these actuating and/or fastening devices can be released and/or locked electrically, manually or pneumatically or hydraulically.

Due to the size of the feed transport device and the poor accessibility, it can be difficult to loosen said guide arch by means of screws and fasteners known in the prior art. In one aspect of the invention, it is therefore proposed that said guide arch is fastened by pneumatic fastening devices and in particular pneumatic clamps. Preferably, these fastening devices act by means of spring force, so that a fastened state exists in an unloaded state. By applying compressed air or a hydraulic medium, for example, this spring force can be overcome and the clamping devices can be released.

The present invention is therefore further directed to a feed transport device for feeding plastic preforms to an apparatus for heating the plastic preforms and, in particular, an apparatus of the type described above, wherein the feed transport device comprises a carrier rotatable with respect to an axis of rotation and a plurality of holding devices which hold the plastic preforms, wherein said holding devices comprise recesses formed on an outer circumference of the carrier and wherein the feed transport device comprises a guide arch arranged radially outside the rotatable carrier, wherein the plastic preforms can be received between said guide arch and the carrier and wherein said guide arch and/or said carrier is detachably fastened to a carrier by at least one and preferably a plurality of fastening means.

According to the invention, these fastening devices can be released and/or locked by drive devices and in particular individual drive devices.

In this embodiment, it is proposed that the corresponding guide arch, which can be changed in particular as part of a format change, can be controlled by one and in particular one central drive, so that it is possible to change these guide archs without additional tools.

Preferably, these drive devices are selected from a group of drive devices which includes pneumatic, hydraulic and electric drive devices. Particularly preferably, these fastening devices can be released by a pneumatic drive.

In a further preferred embodiment, these fastening devices have spring elements which hold the fastening devices in a fastened state. This hold caused by the spring can be released in particular by, for example, a pneumatic means.

In a further preferred embodiment, the guide arch has a segmented structure. For example, it can have two circular segment-shaped elements or the like.

In a further preferred embodiment, each of the holding devices is assigned a application device, in particular one which acts upon the plastic preforms through their mouths with a flowable and in particular gaseous medium (and in particular with ionised air), wherein particularly preferably these application devices are also arranged, as described above, on a carrier which is rotatable about the axis of rotation.

The feed transport device described here is particularly suitable for the application described above, which is more difficult to access than feed transport devices known from the prior art due to the application devices. It is also pointed out that the feed transport device described here is also conceivable for other applications.

The present invention is further directed to a method for heating plastic preforms, wherein the plastic preforms are transported along a predetermined transport path by a transport device during their heating and are thereby held by a plurality of holding devices of said transport device, and wherein the plastic preforms are transferred, in particular directly, to the transport device in a transfer region by a first feed transport device, wherein the first feed transport device comprising a carrier rotatable with respect to an axis of rotation having a plurality of holding devices which hold the plastic preforms.

According to the invention, each of these holding devices is assigned a respective application device which acts upon the plastic preforms through their mouths with a flowable medium, wherein these application devices being arranged on a carrier which can be rotated about an axis of rotation. It is therefore also proposed on the method side that the plastic preforms are both fed to the oven by means of the feed transport device and are also acted upon in this step by a flowable medium and in particular a gaseous or aerosol-like medium.

In a further preferred embodiment, the apparatus described herein comprises an ionisation device which ionises air.

In a further preferred method, the application devices are at least temporarily moved relative to the plastic preforms associated with these application devices in a direction which has a component in the radial direction of the rotatable carrier and which preferably runs exactly in the radial direction.

BRIEF DESCRIPTION OF THE DRAWINGS

Further advantages and embodiments can be seen in the attached drawings.

In the drawings.

DETAILED DESCRIPTION OF THE INVENTION

Figure 1:
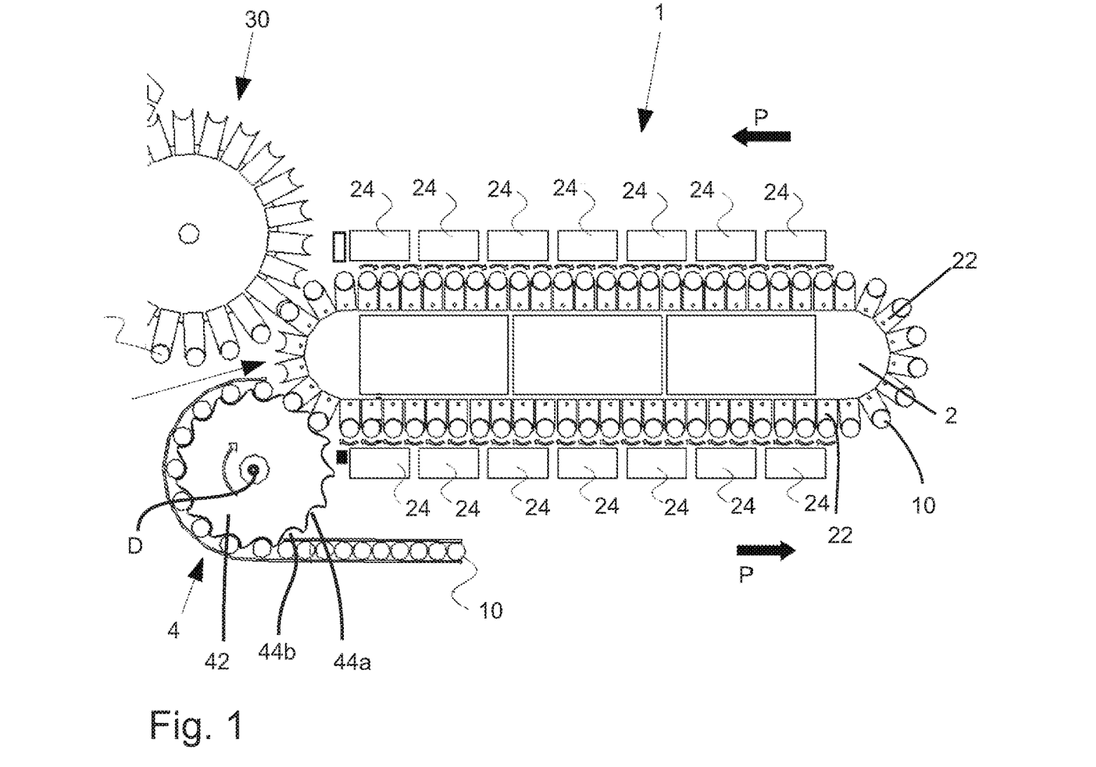
FIG. 1 shows a schematic representation of an arrangement according to the invention for manufacturing plastic containers.

FIG. 1 shows a heating device for heating plastic preforms 10. Reference sign 2 refers in its entirety to a transport device which transports the plastic preforms along a transport path P and past stationary heating devices 24. In the embodiment shown in FIG. 1, this transport device is a circulating chain on which a plurality of holding elements 22 are arranged for holding the plastic preforms. These plastic preforms can also be rotated, as indicated by the small arrows.

The reference sign 4 indicates a feed transport device 4, which is designed here as a clock-in starwheel. It can be seen that the plastic preforms are fed via a feed rail and are separated by the feed transport device 4. The reference sign 42 indicates a carrier which is rotatable with respect to an axis of rotation D and the reference signs 44a and 44b indicate two holding devices which are designed here as recesses which are in turn arranged on the circumference of the rotatable carrier 42.

The reference sign 30 indicates a downstream transport device with which the now heated plastic preforms are transferred to a device (not shown) for forming plastic preforms into plastic containers, such as a blow moulding machine.

Figure 2:
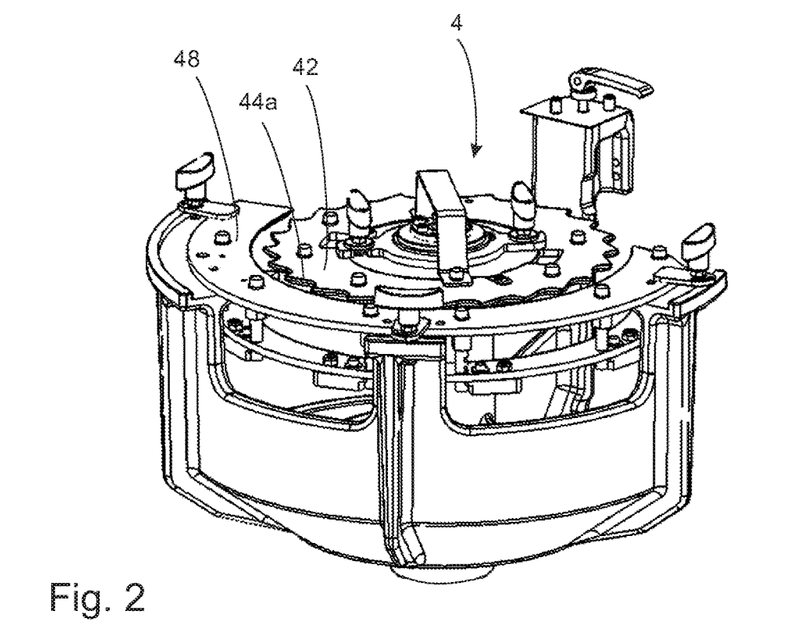
FIG. 2 shows a representation of an embodiment of a feed transport device.

FIG. 2 shows a design of a feed transport device. Again, the rotatable carrier is shown as well as a holding device 44a. The reference sign 48 indicates a guide arch, wherein the plastic preforms (not shown) are arranged and guided between this guide arch and the individual recesses 44a.

This guide arch 48 is attached to a carrier with a plurality of fastening devices. This guide arch is exchangeable in order to be able to adapt to different plastic preforms. The carrier 42 is also preferably exchangeable.

Figure 3:
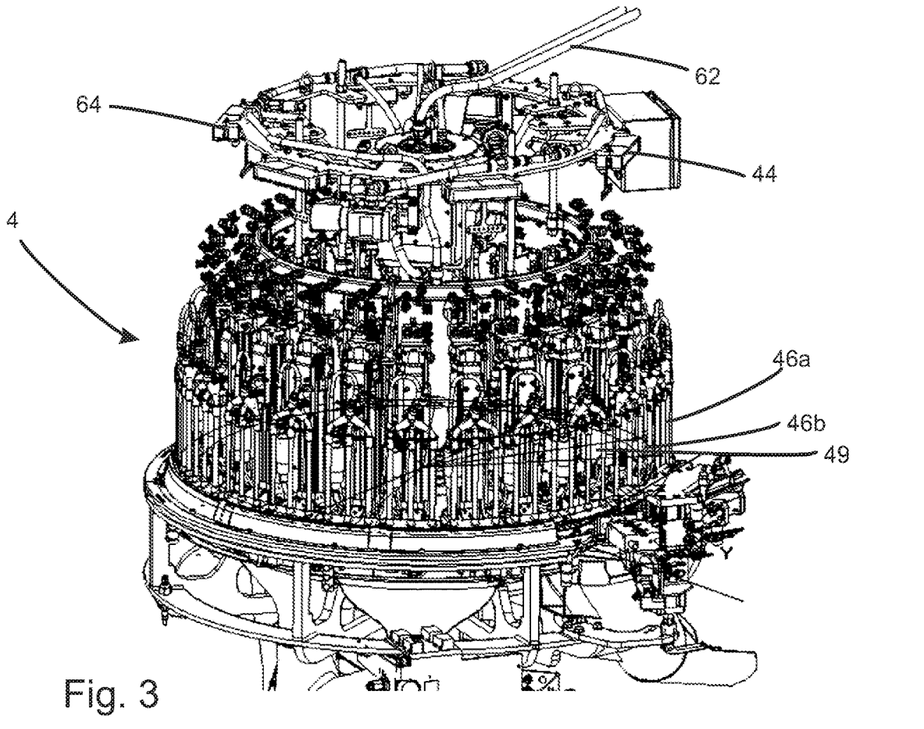
FIG. 3 shows a representation of a feed transport device for an apparatus according to the invention.

FIG. 3 shows an illustration of a feed transport device according to the invention. A plurality of application devices 46a, 46b are provided. These are arranged on a carrier 48 and can be moved in a longitudinal direction of the plastic preforms (not shown), i.e. in a vertical direction in FIG. 3.

The reference sign 62 indicates a supply line via which, for example, a pressurised gaseous medium can be supplied. Reference signs 44 and 64 indicate valve blocks with which this medium can be distributed to the individual application devices.

Figure 4:
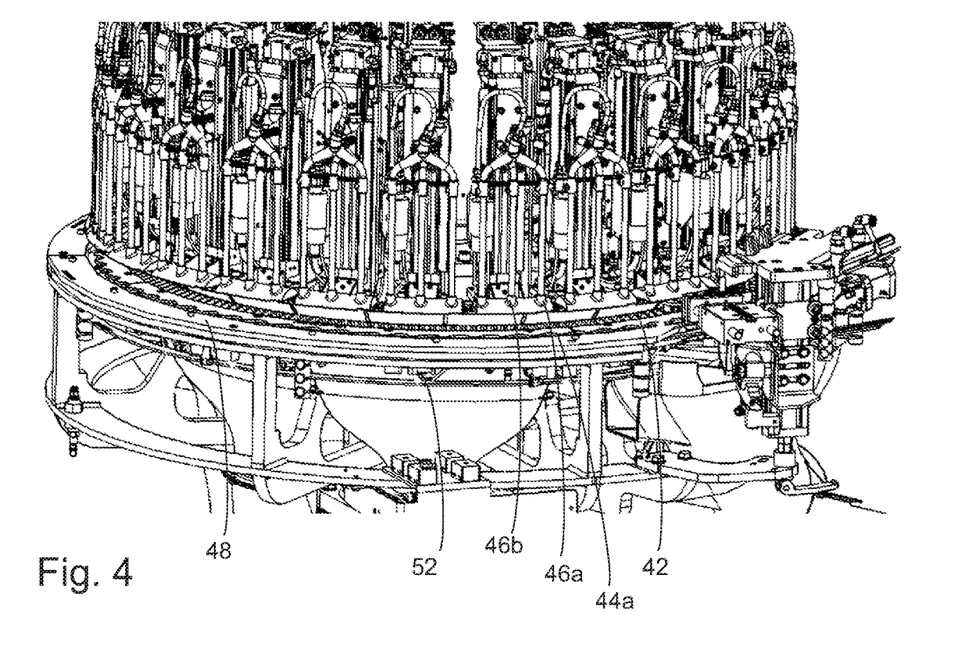
FIG. 4 shows a detailed representation of the feed transport device shown in FIG. 3.

FIG. 4 shows a detailed representation of the apparatus shown in FIG. 3. Here you can again see the carrier 42 as well as the guide arch 48.

The reference sign 52 indicates a fastening device for fastening the guide arch 48 to a further carrier. The reference signs 46a and 46b again indicate application devices, wherein in this case one application device is assigned to each guide device 44a. In the embodiment shown in FIG. 4, three application devices are each attached to a common carrier and can thus be moved in the longitudinal direction of the plastic preforms in order to be inserted into the plastic preforms (not shown).

Figure 5:
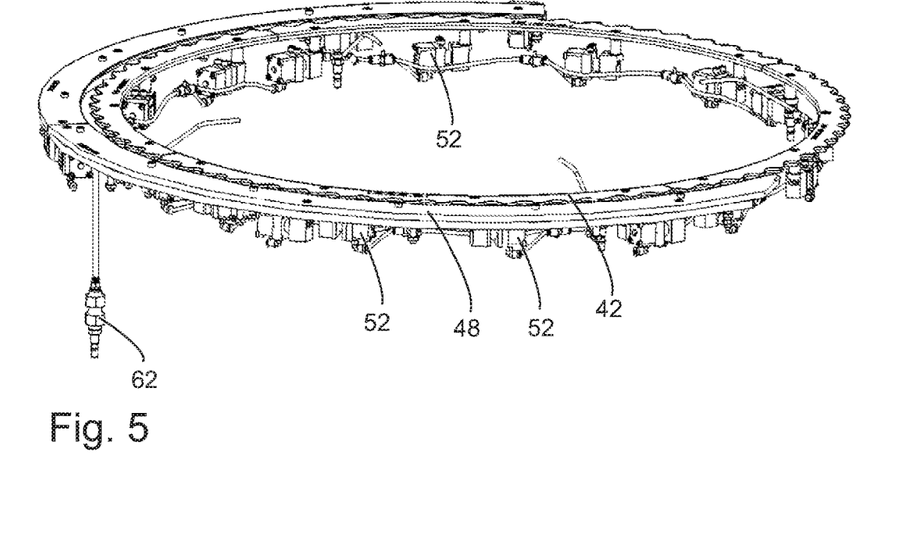
FIG. 5 shows a representation of a part of the feed transport device with pneumatically releasable fastening devices.

FIG. 5 shows a further illustration of the carrier 42 and also of the guide arch 48. The reference signs 52 again indicate clamping devices, more precisely called pneumatic clamps. These are supplied by a central supply device 62 for pneumatic air and could be transferred in this way into a released position. In this position, the guide arch 48, which is segmented in two parts here as shown, can be removed. While in current feed transport devices a starwheel as well as the outer arch 48 are manually screwed, such a structure is rather disadvantageous for the complicated design with application devices.

Due to the size of this starwheel and also the poor accessibility during a fitting change, a screw connection is not possible or advantageous everywhere. Therefore, as mentioned above, it is suggested that the sawtooth starwheel or the carrier as well as the guide fittings are fixed with pneumatic clamps 52 under spring force. For changing, compressed air, for example 10bar compressed air, is connected to the clamping devices and thus the spring clamping is unlocked so that the fittings can be changed without tools.

FIG. 5 shows a corresponding illustration of this assembly. Here, quick-release clamps 52 are provided which hold the outer fitting or the outer arch 48 to its carrier 50. Correspondingly, pneumatic clamps are also provided to hold the carrier or the sawtooth starwheel 42 on a carrier.

Figure 6A:
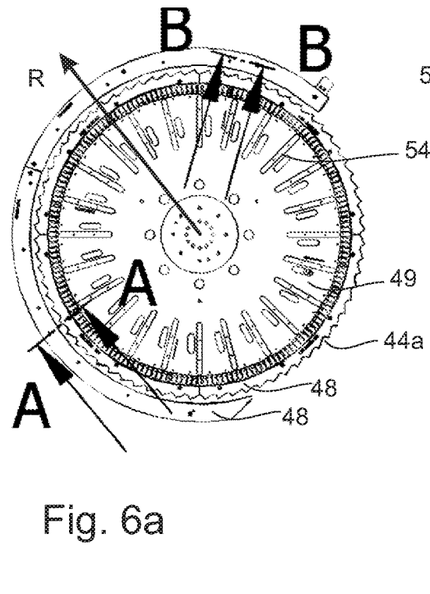
FIGS. 6a-6c show three illustrations of the described fastening device.
Figure 6B:
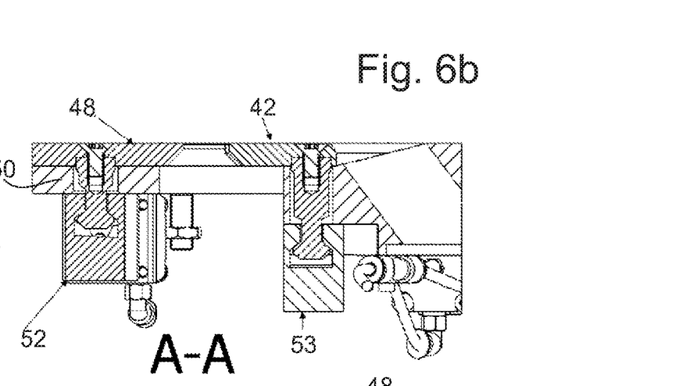
Figure 6C:
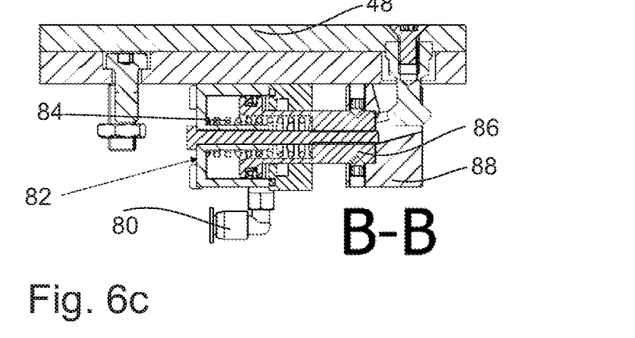

FIGS. 6a to 6c illustrate this tensioning mechanism according to the invention. In the situation shown in FIG. 6A, the carrier 42 is again partially visible. In addition, the carrier 49 can also be seen, on which the (not shown) application devices are arranged. In detail, grooves 54 running in radial direction are also shown, in which the application devices can be shifted radially inwards, as explained above. The reference sign R indicates a radial direction of the carrier 42.

FIG. 6b shows a representation along the lines A-A from FIG. 6a. Here again the carrier 50 is provided, on which the outer arch 48 is arranged. The inner fitting 42 or the carrier with the holding devices can also be seen. The reference signs 52 and 53 each indicate a pneumatic clamping device for the outer guide arch and a pneumatic clamping device for the carrier 42.

FIG. 6c shows a representation along the lines B-B from FIG. 6a. Here, one of these pneumatic clamps 52 is shown in more detail. A spring device 84 can be seen which biases a locking bolt or a projection 86 here to the right, i.e. into the fixed position. By applying compressed air via the supply line 80, the piston is moved inwards within the piston chamber 82, thus releasing the lock. The reference sign 88 indicates a carrier.

Figure 7:
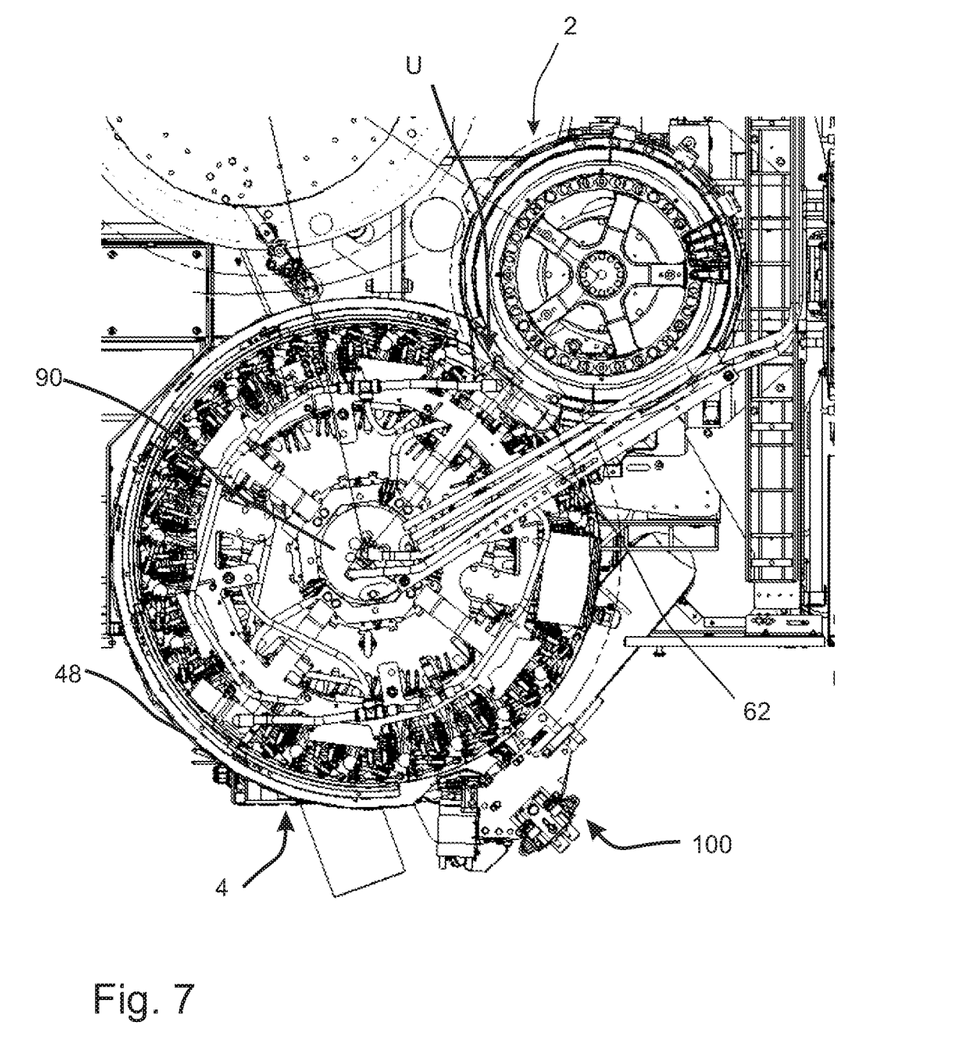
FIG. 7 shows a partial top view of an apparatus according to the invention.

FIG. 7 shows a top view of the apparatus according to the invention. The transport device 2 or a transfer wheel of the same can be seen here. The reference sign 62 indicates a feed device for feeding a flowable and, in particular, gaseous medium to the feed transport device 4 or the individual application devices. Reference sign 90 schematically indicates a rotary distributor that transfers this gaseous medium to the rotating part with the application devices. In addition, the outer arc that serves to form the holding devices 44a and 44b can also be seen here.

The reference sign 100 identifies a clocking-in device at which the plastic preforms are transferred in series to the feed transport device 4.

The applicant reserves the right to claim all features disclosed in the application documents as essential to the invention, provided that they are individually or in combination new compared to the prior art. It is further pointed out that the individual figures also describe features which may be advantageous in themselves. The skilled person immediately recognises that a certain feature described in a figure can also be advantageous without adopting further features from this figure. Furthermore, the skilled person recognises that advantages can also result from a combination of several features shown in individual figures or in different figures.

LIST OF REFERENCE SIGNS 1 apparatus
2 transport device
4 feed transport device
10 plastic preforms
22 holding elements
24 heating devices
30 subordinate transport device
42 rotatable carrier/feeding device/pneumatic clamp/sawtooth starwheel
44, 64 valve blocks
44a recesses/guiding device
44a, 44b holding devices
46a, 46b application devices
48 guide arch/carrier/outer arch
49, 50 carrier
52, 53 fastening device/pneumatic clamping device
54 grooves
62 feed line/feed device
80 feed line
84 spring device
86 projection
88 carrier
90 rotary distributor
100 clocking-in device
P transport path
D axis of rotation
L direction
AA and BB lines from FIG. 6A

The invention claimed is:

1. An apparatus for heating plastic preforms with a transport device configured to transport the plastic preforms during their heating along a predetermined transport path, wherein the transport device has a plurality of holding devices configured to hold the plastic preforms during their transport, with a first feed transport device which directly transfers the plastic preforms to the transport device in a transfer region, wherein this first feed transport device has a carrier configured for rotation with respect to an axis of rotation and has a plurality of holding devices configured to hold the plastic preforms, and wherein each of the holding devices is in each case assigned an application device configured to act upon the plastic preforms through their mouths with a flowable medium comprising ionized air, wherein the application devices are arranged on a carrier configured for rotation about the axis of rotation, wherein the application devices are movable relative to the plastic preforms associated with the application devices in a direction which has a component in a radial direction of the rotatable carrier.

2. The apparatus according to claim 1, wherein the application devices are movable relative to the carrier with respect to the plastic preforms associated with the application devices.

3. The apparatus according to claim 1, wherein the application devices are movable relative to the plastic preforms associated with the application devices in the transfer region in a direction of the axis of rotation.

4. The apparatus according to claim 1, wherein the apparatus has a drive device configured to effect the movements of the application devices relative to the carrier.

5. The apparatus according to claim 1, wherein the application devices are movable in a longitudinal direction of the plastic preforms relative to the plastic preforms, wherein the apparatus is provided with at least one drive device configured for moving the application devices relative to the plastic preforms in longitudinal directions thereof.

6. The apparatus according to claim 1, wherein the holding devices of the feed transport device are recesses arranged on an outer circumference of the carrier.

7. The apparatus according to claim 1, wherein a further transport device for transporting the plastic preforms is arranged upstream of the feed transport device in the transport direction, which transport device is configured to transfer the plastic preforms to the feed transport device and which transports the plastic preforms in a row.

8. A feed transport device for feeding plastic preforms to an apparatus for heating the plastic preforms, wherein said feed transport device has a carrier rotatable with respect to an axis of rotation and a plurality of holding devices configured to hold the plastic preforms, wherein said holding devices are formed as recesses formed on an outer circumference of the carrier, and wherein the feed transport device has a guide arch arranged radially outside the carrier, wherein the plastic preforms can be received between this guide arch and the carrier, and wherein this guide arch and/or the carrier is detachably fastened to a carrier by at least one fastening device, wherein the fastening device is detachable and/or fixable by drive devices.

9. A method for heating plastic preforms, wherein the plastic preforms are transported along a predetermined transport path by a transport device during their heating and are held by a plurality of holding devices of the transport device and wherein the plastic preforms are transferred by a first feed transport device of the transport device in a transfer region, wherein the first feed transport device has a carrier which can be rotated with respect to an axis of rotation and has a plurality of holding devices which hold the plastic preforms, wherein each of the holding devices is in each case assigned an application device which acts upon the plastic preforms through their mouths with a flowable medium comprising ionized air, wherein the application devices are arranged on a carrier which can be rotated about an axis of rotation, wherein the application devices are moved at least temporarily relative to the plastic preforms associated with these application devices in a direction which has a component in a radial direction of the rotatable carrier.

10. The apparatus according to claim 2, wherein the application devices are movable relative to the plastic preforms associated with the application devices in the transfer region in the direction of the axis of rotation.

11. The apparatus according to claim 2, wherein the apparatus has a drive device configured to effect movements of the application devices relative to the carrier.

12. The apparatus according to claim 2, wherein the application devices are movable in a longitudinal direction of the plastic preforms relative to the plastic preforms, wherein the apparatus is provided with at least one drive device configured for moving the application devices relative to the plastic preforms in a longitudinal directions thereof.

13. The apparatus according to claim 3, wherein the application devices are movable relative to the plastic preforms associated with the application devices in the transfer region in the direction of the axis of rotation.

14. The apparatus according to claim 3, wherein the apparatus has a drive device configured to effect movements of the application devices relative to the carrier.

15. The apparatus according to claim 3, wherein the application devices are movable in a longitudinal direction of the plastic preforms relative to the plastic preforms, wherein the apparatus is provided with at least one drive device configured for moving the application devices relative to the plastic preforms in a longitudinal directions thereof.

16. The feed transport device according to claim 8, wherein the guide arch and/or the carrier between the guide arch and the carrier is detachable fastened to the carrier by a plurality of fastening device.

17. The method according to claim 9, wherein the plastic preforms are transferred directly by the transport device in the transfer region.

* * * * *